United States Patent [19]

Murphy

[11] Patent Number: 5,695,139
[45] Date of Patent: Dec. 9, 1997

[54] FISHING REEL WITH STAGED RELEASE OF LURE AND LINE

[76] Inventor: John J. Murphy, 705 W. Pine St., Lancaster, Wis. 53813

[21] Appl. No.: 562,165

[22] Filed: Nov. 22, 1995

[51] Int. Cl.$^6$ ..................................................... A01K 89/01
[52] U.S. Cl. ........................ 242/239; 242/311; 242/312; 242/323; 43/19
[58] Field of Search ......................... 242/233, 230, 242/238, 239, 323, 311, 312; 43/19, 19.2

[56] References Cited

U.S. PATENT DOCUMENTS

| | | | |
|---|---|---|---|
| 2,817,178 | 12/1957 | Keck | 43/19 |
| 3,142,127 | 7/1964 | Mason | 43/19 |
| 4,166,591 | 9/1979 | Shepard | 242/230 |
| 5,342,003 | 8/1994 | Sugawara et al. | 43/19 X |
| 5,363,584 | 11/1994 | Lo | 43/19 |

Primary Examiner—Daniel P. Stodola
Assistant Examiner—Emmanuel M. Marcelo
Attorney, Agent, or Firm—Bernard J. Murphy

[57] ABSTRACT

A wheel, journalled on supports atop the reel housing has a slot formed therein. Limbs attached to both the wheel, and the reel thumb actuator, cause the wheel to rotate in common with depression of the actuator, and dispose the slot rearwardly. The slot latchingly receives the hook of a lure, with the fishing rod bent into an energy-stored, strained disposition. With release of the thumb actuator, the lure flies outwardly in a substantially flat trajectory. Also, the cone is only slidably coupled to the reel housing, so that line will not be released until the cone, biasingly held to the housing, returns into full engagement with the housing.

9 Claims, 3 Drawing Sheets

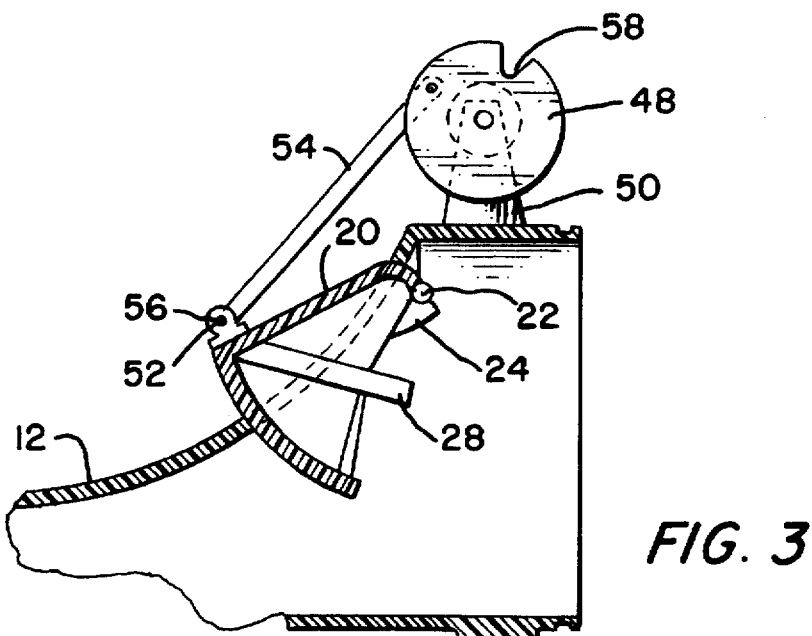
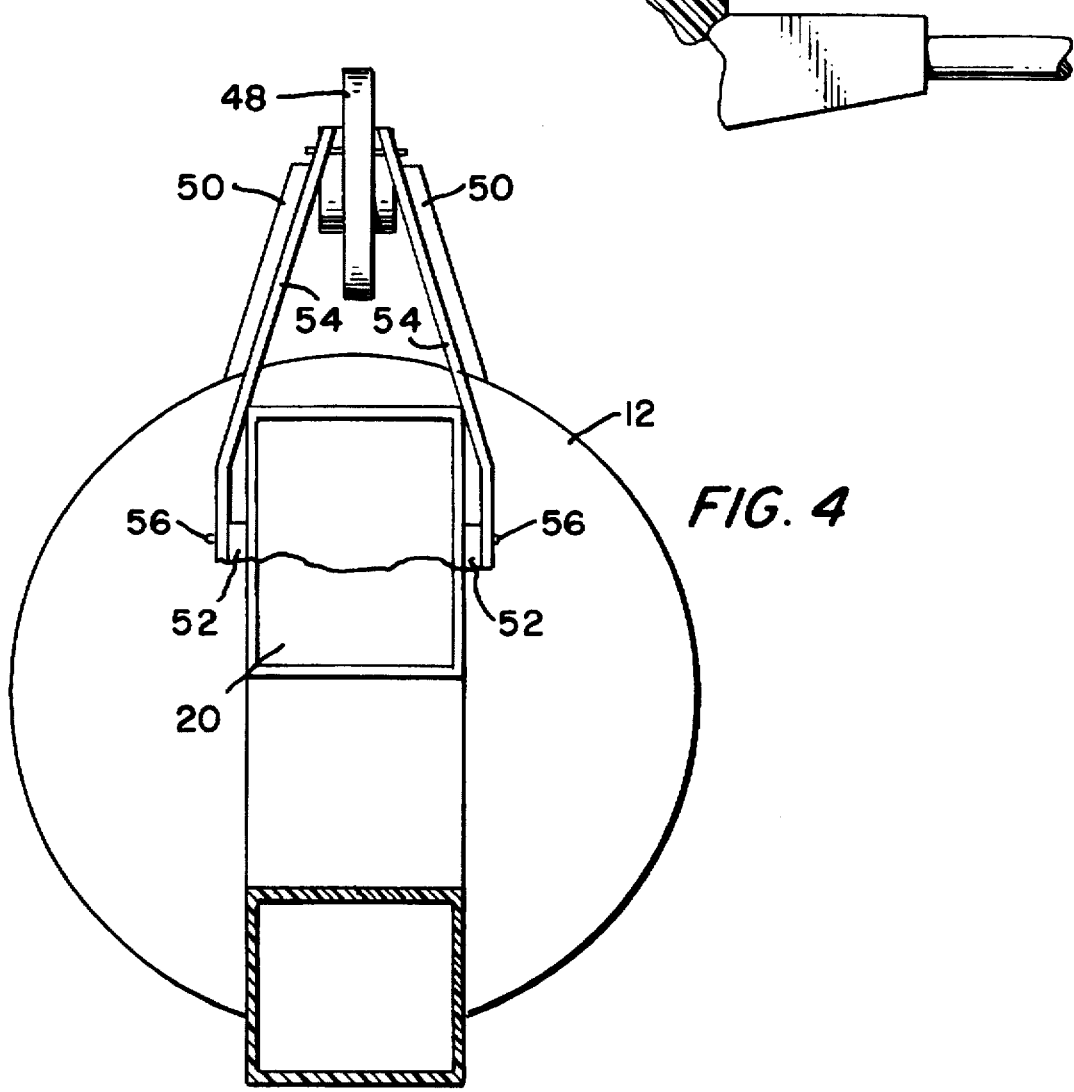

FISHING REEL WITH STAGED RELEASE OF LURE AND LINE

This invention pertains to fishing reels, those devices which have a spindle for holding a length of fishing line, and a crank for retrieving line onto the spindle, and in particular to such reels, used especially for casting, which also have a thumb actuator for holding and releasing line from the spindle, selectively.

Fishing reels of the aforesaid type, which are known in the prior art, have a housing, and a cone, centrally apertured for the pay-out of line, threadedly joined to the housing. The housing and cone confine a spindle assembly which holds the fishing line thereon, and a crank projects from the reel; the crank operates a pair of meshing gears which cause the spindle to retrieve line. A thumb actuator which is pivotally mounted to the housing, and projects therefrom, is operative to engage a rotatable shaft in the spindle for the purpose of moving the shaft towards the cone. The shaft carries thereon a disc which rotates in common with the shaft. When the shaft is advanced towards the cone, the disc frictionally engages the inner surface of the cone and prevents release of line. Then, upon the thumb actuator withdrawing from the shaft, the disc removes from the cone, is free to rotate, and permits line to be payed-out.

On casting a lure, then, one holds the thumb actuator depressed, in order that the disc will hold the line against pay-out, swings the fishing rod to generate centrifugal force and, at the optimum time, releases the thumb actuator so that line can pay out and permit the lure to fly outwardly in a wide arcing trajectory. Of course, timing is everything. If the thumb actuator is released too soon, the lure will drop at the feet of the fisherman. If it is released too late, the lure will be stopped from benefiting from the centrifugal force; the late-released line will cause the cast of the lure to be foreshortened.

What has long been needed is a fishing reel which obviates the aforesaid problems. Specifically, there is an unmet need for a fishing reel which can displace the cone, while holding the disc in frictional engagement therewith so that the line will be held on the spindle, hold the lure in an energy stored disposition, a tensioned-charged disposition, that is, in which release of the thumb actuator will cause the lure to fly outwardly in a substantially flat, arrow-like trajectory, and sequentially thereafter, and substantially immediately thereafter, will free up the line to allow it to follow the lure. Such a fishing reel would offer an almost fool-proof casting facility, as the same would effect such an aforedescribed two-step release, first of the lure, and then of the line.

It is an object of this invention to set forth just such a long sought fishing reel. Particularly, it is an object of this invention to disclose a fishing reel comprising a housing; a cone, slidably engaged with said housing, and centrally apertured for pay-out of fishing line therefrom; and a spindle assembly confined within said housing and said cone; wherein said spindle has a reciprocable shaft, and a disc integrally coupled to said shaft for rotation therewith; and a thumb actuator pivotably coupled to said housing; wherein said actuator comprises means for (a) engaging and displacing said shaft, and (b) concomitantly forcing said disc to engage and slidably move said cone relative to said housing.

It is also an object of this invention to set forth such an aforesaid fishing reel having means mounted to said housing operative in a first mode for holding a line-attached lure, in restraint, thereat, and operative in a second mode for releasing such a line-attached lure therefrom.

It is also an object of this invention to set forth a fishing reel comprising a housing; and a cone engaged with said housing; wherein said cone has a central aperture formed therein for pay-out of fishing line through said aperture; and a spindle assembly confined within said housing and cone; wherein said spindle assembly has a dual-ended shaft means, reciprocable in a first, given direction, and a second, opposite direction; a disc coupled to a first end of said shaft means, and in proximity to said cone; a thumb actuator pivotably coupled to said housing; wherein said actuator comprises means movable in said first, given direction for engaging and moving a second end of said shaft means, from a given disposition thereof, in said first, given direction, and concomitantly forcing said disc frictionally to engage said cone to prohibit rotation of said disc; and biasing means, engaged with said shaft, for (a) opposing movement of said actuator in said first, given direction, and operative (b) for moving said actuator in said second direction and returning said second end of said shaft means to said given disposition, and (c) concomitantly causing said disc to disengage from said cone to permit rotation of said disc.

Further objects of this invention, as well as the novel features thereof, will become apparent be reference to the following description, taken in conjunction with the accompanying figures, in which:

FIG. 3 is a cross-sectional view of the housing;

FIG. 4 is rear view of the housing, with the handle cross-sectioned, the view here being enlarged over the scale of FIGS. 1 through 3;

Figure 1:
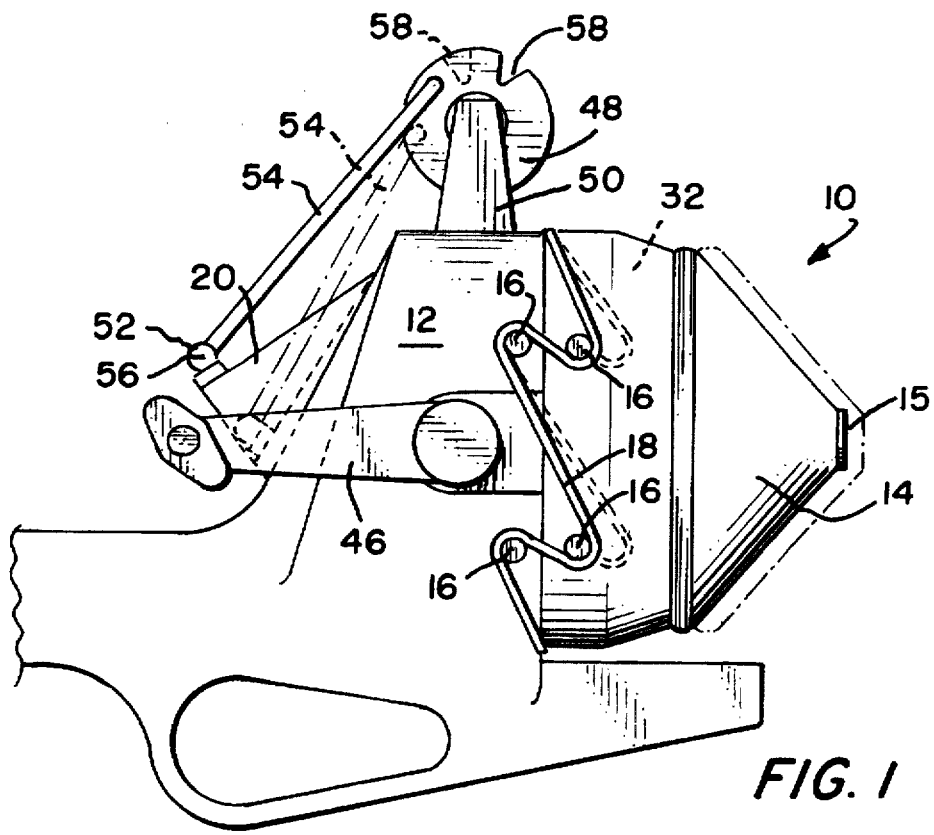
FIG. 1 is a side elevational view of the novel fishing reel, according to an embodiment of the invention.
Figure 2:
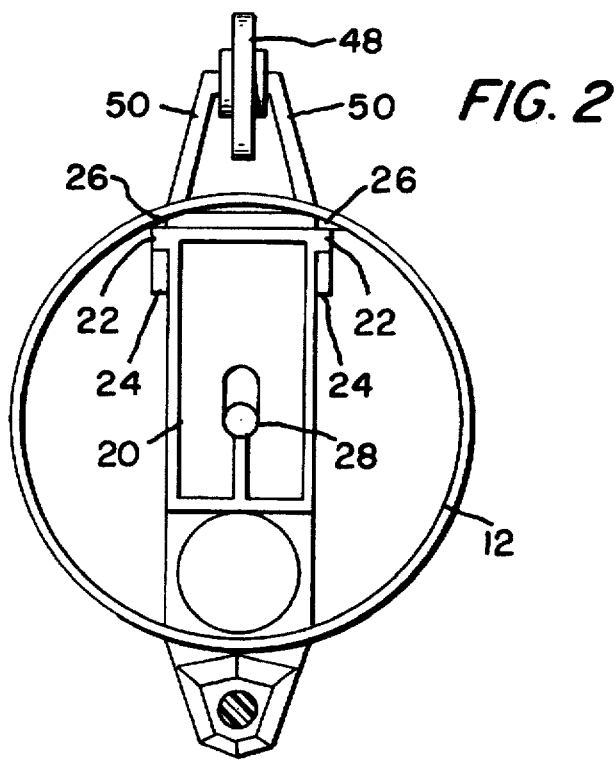
FIG. 2 is a frontal, elevational view of the reel housing, with the cone and spindle assembly removed therefrom.
Figure 5:
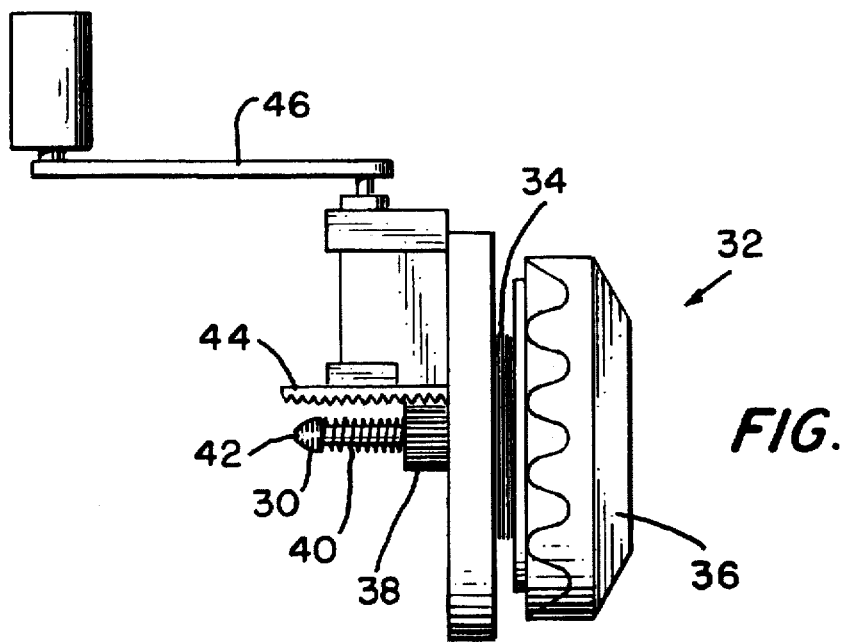
FIG. 5 is a side elevational view of the spindle assembly.

As shown in FIG. 1, the novel fishing reel 10 comprises a housing 12 and a cone 14, the cone having an aperture 15 through which fishing line can be payed out. Housing 12 and cone 14 have thereabout a plurality of buttons 16 with which an elastic band 18 is in fast engagement. The band 18 biasingly holds the cone 14 onto the housing 12 because, according to my invention, the cone is only slidably engaged with the housing 12. A lever, that is a thumb actuator 20 is pivotably mounted to the housing 12 by means of a pair of round, short dowels 22 which are journalled in holders 24 and abutments 26 which are integral with the housing; the dowels have a snap fit in the holders 24 and abutments 26, as shown in FIG. 2. Integral with the thumb actuator 20, and projecting inwardly, relative to the housing, is a rod 28. The rod 28 is provided for engaging, and displacing a shaft 30 of the spindle assembly 32 shown in FIG. 5. The spindle assembly 32 carries the fishing line 34 thereon, and the shaft 30 has a disc 36 commonly coupled thereto. In addition, the shaft 30 is spring-held outwardly from a spur gear 38 by a compression spring 40 which is interposed between the gear 38 and an enlarged end 42 of the shaft 30. With rotation of the gear 38, the shaft 30 and disc 36 rotate, and effect retrieval of line 34. The gear 38 is rotated, in turn, by a mating gear 44 which is driven by a crank handle 46.

As earlier explained, the rod 28 is advanced to the shaft 30, by depression of the thumb actuator 20, to cause the disc 36 to close into frictional engagement with the inner surface of the cone 14, thereby preventing rotation of the shaft 30 and disc 36, and insuring that line 34 will not be payed out.

This is standard functioning for known, prior art fishing reels. However, as noted, my invention comprises the movement of the cone 14 away from the housing 12 when the thumb actuator 20 forces the rod 28 against the shaft 30. A displaced, advanced positioning of the cone 14 is shown in dashed outline in FIG. 1, and with this positioning of the cone 14, the fishing line 34 is similarly held against pay out. In addition, however, the novel reel 10 comprises means for holding a lure in a tensioned restraint awaiting release.

FIGS. 1 through 4 show a wheel 48 rotatably journalled on supports 50 atop the housing 12. Too, the thumb actuator 20 has a pair of bosses 52 integral therewith. A pair of limbs 54 are coupled at first ends thereof to the bosses 52 with pivot pins 56, and coupled at the opposite ends thereof to the wheel 48 with like pins. The wheel 48 has a slot 58 formed in the periphery thereof.

With the thumb actuator 20 released, and extending outwardly from the housing 12, the limbs 54 cause the wheel 48 to assume a positioning quite like that shown in FIG. 3; here the wheel is rotated so that the slot 58 is forwardly directed. With depression of the thumb actuator 20, however, the limbs 54 cause the wheel 48 to rotate in a counter-clockwise direction, and present the slot 58 in a rearwardly-facing direction. Of course, with the thumb actuator 20 depressed, as priorly explained, the line 34 is held against release, and the cone 14 is forwardly displaced relative to the housing 12. By manipulation of the thumb actuator 20, a short length of line is released, and then the actuator is pressed again into the housing 12 to hold the rest of the line at halt. A lure, affixed to the short line, is pulled back, causing the fishing rod to bend, and the lure is engaged with the slot 58, the latter being in its rearwardly-facing disposition. Now, clearly, unless and until the thumb actuator is released, the lure, held in the slot 58 by one of its hooks or whatever, is ready to fly outwardly due to the stored energy in the bent fishing rod.

By steady release of the thumb actuator 20, the limbs 54 rotate the wheel 48 disposing the slot 58 forwardly, and releasing the lure in its energized flight. However, with release of the thumb actuator 20, the cone 14 proceeds to slide rearwardly into closure against the housing 12 again. Even so, while the cone 14 is moving inwardly again, from its outwardly displaced positioning, it keeps a frictional engagement with the disc 36 and, accordingly, line 34 cannot release. Until the cone 14 is seated again in closure against the housing 12, the line 34 is held fast. By a practiced exercise, one readily learns to give the thumb actuator 20 an optimum, steady release so that first the lure is freed from the wheel 48, and immediately thereafter the line 34 is released. Accordingly, one can "fire" the lure, like a missile or arrow, under a dock, beneath low-lying tree branches, and such, with line freed up therebehind to follow.

Figure 6:
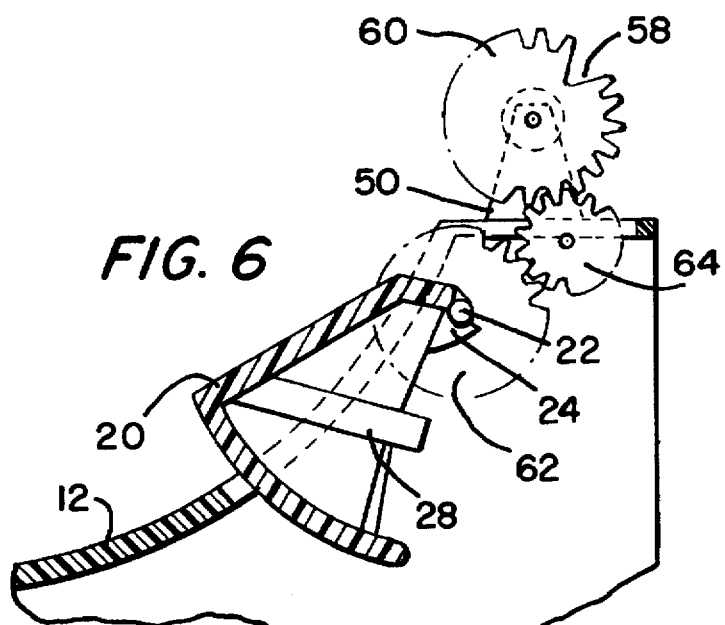
FIG. 6 is a view like that of FIG. 3 showing, however, an alternative embodiment of the invention.
Figure 7:
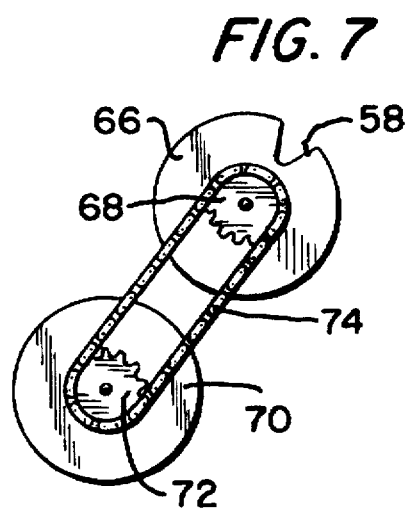
FIG. 7 is an illustration of another embodiment of the invention.

FIGS. 6 and 7 disclose alternative arrangements of the invention for controlling the positioning of the slot 58. In FIG. 6, and in lieu of limbs 54, a gearing arrangement is provided. Here a first spur gear 60, having the slot 58 formed therein, replaces the wheel 48. A second spur gear 62 is mounted to the thumb actuator 20 for rotation therewith. Finally, a third spur gear 64, the same serving as an idler, is journalled on the inner surface of the top of the housing 12. Gear 64 takes drive from gear 62, and transmits the same to gear 60. With depression of the thumb actuator 20, gear 62 rotates in a counterclockwise direction, causing gear 64 with which it is in mesh to rotate in the clockwise direction. In turn, gear 64 rotation causes the gear 60 to rotate in the counterclockwise direction, turning the slot 58 rearwardly and ready for latching of the lure thereinto.

In the FIG. 7 arrangement, the wheel 48 is supplanted with wheel 66 which has the slot 58 formed therein and which carries a sprocket 68. Too, gear 62, of the FIG. 6 embodiment, is supplanted by another wheel 70 which has a like sprocket 72 fixed thereon. Then, an endless chain-link belt 74 is enwrapped about both sprockets 68 and 72.

My invention teaches arrangements in a fishing reel which provide staged release of a tethered and tensioned lure, and line, by the simple manipulation of the thumb actuator 20.

While I have described my invention in connection with specific embodiments thereof, it is to be clearly understood that this is done only by way of example, and not as a limitation to the scope of the invention as set forth in the objects thereof, and in the appended claims. For instance, rather than employ the rubber band 18, internal biasing means can be employed to hold the cone 14 against the housing 12. Too, I contemplate that, with practice, a fisherman will determine how far back to draw the rod, in a bowed configuration, for latching of the lure into the slot 58, and for this reason the fishing rod itself will have graduated bands or like indicia, indicative of how far to draw back the lure and fishing rod to effect the pitch of the lure in its flight. Clearly, the fisherman will, with experience, learn that band or indicium such and such will effect a given flight, and another, chosen band will effect a different, further or foreshortened flight. These, and other alternative modifications which will occur to others by taking teaching from my disclosure are deemed to be within the ambit of my invention, and embraced by the appended claims.

I claim:

1. A fishing reel, comprising:

a housing;

a cone slidably engaged with said housing, and centrally apertured for pay-out of fishing line therefrom; and a spindle assembly confined within said housing and said cone; wherein said spindle assembly has a reciprocable shaft, and a disc coupled to said shaft for reciprocation in common with said shaft; and a thumb actuator pivotably coupled to said housing; wherein said actuator comprises means for (a) engaging and reciprocably displacing said shaft, and (b) concomitantly forcing said disc frictionally to engage said cone and slidably move said cone relative to said housing.

2. A fishing reel, according to claim 1, wherein:

said actuator comprises a lever; and said shaft engaging and displacing means comprises a rod integral with, and projecting inwardly, relative to said housing, from said lever.

3. A fishing reel, according to claim 1, further including:

means mutually engaging said housing and said cone biasingly holding said cone in engagement with said housing.

4. A fishing reel, according to claim 3, wherein:

said housing and said cone have buttons thereabout and extending externally therefrom; and said mutually engaging means comprises an elastic band engaging said buttons.

5. A fishing reel, according to claim 3, further including:

means mounted to said housing operative in a first mode for holding a line-attached lure, in restraint, thereat, and operative in a second mode for releasing such a line-attached lure therefrom.

6. A fishing reel, according to claim 5, further including:

means coupled to said actuator for changing operation of said lure-holding and lure-releasing means from one of said first and second modes of operation thereof to the other of said modes.

7. A fishing reel, comprising:

a housing;

a cone, slidably engaged with said housing, and centrally apertured for pay-out of fishing line therefrom; and a spindle assembly confined within said housing and said cone; wherein said spindle assembly has a reciprocable shaft, and a disc rotatably coupled to said shaft; and a thumb actuator pivotably coupled to said housing; wherein said actuator comprises means for (a) engaging and displacing said shaft, and (b) concomitantly forcing said disc to engage and slidably move said cone relative to said housing; further including means mutually engaging said housing and said cone biasingly holding said cone in engagement with said housing;

means mounted to said housing operative in a first mode for holding a line-attached lure, in restraint, thereat, and operative in a second mode for releasing such a line-attached lure therefrom; and means coupled to said actuator for changing operation of said lure-holding and lure-releasing means from one of said first and second modes of operation thereof to the other of said modes; wherein said lure-holding and lure-releasing means comprises a wheel;

said wheel has a slot formed in the periphery thereof, and is rotatably mounted atop said housing; and said operation changing means comprises a limb coupled at one end thereof to said actuator, and coupled at the opposite end thereof to said wheel.

8. A fishing reel, comprising:

a housing;

a cone, slidably engaged with said housing, and centrally apertured for pay-out of fishing line therefrom; and a spindle assembly confined within said housing and said cone; wherein said spindle assembly has a reciprocable shaft, and a disc rotatably coupled to said shaft; and a thumb actuator pivotably coupled to said housing; wherein said actuator comprises means for (a) engaging and displacing said shaft, and (b) concomitantly forcing said disc to engage and slidably move said cone relative to said housing; further including means mutually engaging said housing and said cone biasingly holding said cone in engagement with said housing;

means mounted to said housing operative in a first mode for holding a line-attached lure, in restraint, thereat, and operative in a second mode for releasing such a line-attached lure therefrom; and means coupled to said actuator for changing operation of said lure-holding and lure-releasing means from one of said first and second modes of operation thereof to the other of said modes; wherein said lure-holding and lure-releasing means comprises a first spur gear;

said gear has a slot formed in the periphery thereof; and said operation changing means comprises a second spur gear coupled to said actuator for common pivotable rotation therewith, and a third spur gear journalled in said housing, and in engagement with both said first and second spur gears.

9. A fishing reel, comprising:

a housing;

a cone, slidably engaged with said housing, and centrally apertured for pay-out of fishing line therefrom; and a spindle assembly confined within said housing and said cone; wherein said spindle assembly has a reciprocable shaft, and a disc rotatably coupled to said shaft; and a thumb actuator pivotably coupled to said housing; wherein said actuator comprises means for (a) engaging and displacing said shaft, and (b) concomitantly forcing said disc to engage and slidably move said cone relative to said housing; further including means mutually engaging said housing and said cone biasingly holding said cone in engagement with said housing;

means mounted to said housing operative in a first mode for holding a line-attached lure, in restraint, thereat, and operative in a second mode for releasing such a line-attached lure therefrom; and means coupled to said actuator for changing operation of said lure-holding and lure-releasing means from one of said first and second modes of operation thereof to the other of said modes; wherein said lure-holding and lure-releasing means comprises a wheel having a sprocket coupled thereto;

said wheel has a slot formed in the periphery thereof; and said operation changing means comprises another wheel coupled to said actuator for common pivotable rotation therewith;

said another wheel has a sprocket coupled thereto; and an endless chain-link belt enwrapped about both of said sprockets.

* * * * *